United States Patent [19]

Ohtaki

[11] 4,308,580

[45] Dec. 29, 1981

[54] DATA MULTIPROCESSING SYSTEM HAVING PROTECTION AGAINST LOCKOUT OF SHARED DATA

[75] Inventor: Saburo Ohtaki, Tokyo, Japan

[73] Assignee: Nippon Electric Co., Ltd., Tokyo, Japan

[21] Appl. No.: 73,364

[22] Filed: Sep. 7, 1979

[30] Foreign Application Priority Data

Sep. 14, 1978 [JP] Japan .................. 53-113937

[51] Int. Cl.³ .......................................... G06F 13/00
[52] U.S. Cl. .................................................. 364/200
[58] Field of Search ..................... 364/200 MS File

[56] References Cited

U.S. PATENT DOCUMENTS

| | | | |
|---|---|---|---|
| 3,317,898 | 5/1967 | Hellerman | 364/200 |
| 3,348,210 | 10/1967 | Ochsmer | 364/200 |
| 3,469,239 | 9/1969 | Richmond et al. | 364/200 |
| 3,528,062 | 8/1970 | Lehman et al. | 364/200 |
| 3,551,892 | 12/1970 | Driscoll, Jr. | 364/200 |
| 4,000,485 | 12/1976 | Barlow et al. | 364/200 |
| 4,050,059 | 9/1977 | Williams et al. | 364/200 |

OTHER PUBLICATIONS

Edsger W. Dijkstra, *The Structure of the "THE"-Multi-programming System*, Commun. of the Acm, vol. 11, No. 5, May 1968, pp. 341-346.
E. W. Dijkstra, *Co-Operating Sequential Processes*, NATO Advanced Study Institute, (Academic Press, 1968), pp. 43-112.
Samir S. Husson, *Microprogramming Principles and Practices*, (Prentice Hall, 1970), pp. 1-19.

*Primary Examiner*—Harvey E. Springborn
*Attorney, Agent, or Firm*—Fitzpatrick, Cella, Harper & Scinto

[57] ABSTRACT

A data multiprocessing system has use-status word control circuitry for managing the exclusive use by individual processors one at a time of the common data resources of a shared main memory unit. To avoid the "system down" that occurs when a processor having exclusive use of such a common resource becomes inoperative, the control circuits of a still operative processor seeking to use that common resource will set the use-status words associated with the common resource back to a usable state thereby permitting that resource to be used by the operative processor.

7 Claims, 8 Drawing Figures

DATA MULTIPROCESSING SYSTEM HAVING PROTECTION AGAINST LOCKOUT OF SHARED DATA

BACKGROUND OF THE INVENTION

1. Field of the Invention

The invention relates to a data processing system and, particularly, to a data multiprocessing system having a plurality of processors.

2. Description of the Prior Art

With a view toward improving system performance and reliability, a data processing system using a plurality of processors has recently been put into practice. In this type of data processing system the processors make common use of a main memory unit (MMU) in order to execute interrelated processes. The MMU stores a use-status word to indicate whether specific data stored as a common resource in the MMU (for example, control data to synchronize the operation of each processor) is available for exclusive use, or not. Generally, logical "0" (or "1") indicates that the data of the specific common resource desired is available for exclusive use, while "1" (or "0") indicates that it is not so usable. Each processor, before use of the common resource, reads out the use-status word to determine whether the common resource is usable or not, by means of an arithmetic and logic circuit (ALU) provided in the processor. If the common resource is usable, the status word is set to the state representing the inhibition of exclusive use of the common resource. Following this, the processor moves on to an operation to use the common resource. On the other hand, when the status word indicates that the exclusive use of the common resource is impossible because the resource is currently used by another processor, the processor either waits until the status word indicates the usable state of the common resource or avoids the use of the common resource.

As described above, each processor in such a data processing system reads out the status word stored in the MMU before the use of the common resource, judges the contents of the status word read out, and (if the resource is usable) sets the status word to "1" or "0" to have exclusive use of the resource.

Another type of multiprocessing system also put to practical use is one in which the MMU itself judges whether the status word indicates the usable or unusable state of the resource. In this type data processing system, each processor sends to the MMU a test-and-set request as a special request as well as write-in data to set the status word to the unusable common resource state. Then, the MMU reads out the status word and judges by use of an ALU provided in the MMU whether or not the contents of the status word read out coincides with "0" representing the usable common resource. As a result of this judgement, when the status word indicates that the common resource is usable, the write-in data given from the processor is set into the status word to set the word to the unusable resource state. On the other hand, when the status word indicates the unusable state of the common resource, the status word remains unchanged. Irrespective of the judging result, the MMU sends the result of the judgement to the processor as a reply. Upon receipt of the reply, the processor tests whether the resource is usable or not on the basis of the status word included in the reply signal. On the basis of result of the test, the processor either starts the use of the common resource, waits until the resource is usable, or avoids the use of the common resource.

In both of these cases, after the use of the common resource is completed, the processor changes the contents of the status word back to the usable resource state by the write instruction for the MMU.

In multiprocessing systems, the above-mentioned operation has generally been performed by software technology. Recently, however, many functions thus made by the software have gradually been superseded by hardware or firmware technology. Such a system arrangement is discussed in detail by Edsger W. Dijkstra in his paper entitled "The structure of the "THE'-'—Multiprogramming System," in Communications of the ACM, Volume 11, Number 5, published in May 1968 by the Association for Computing Machinery, and by the same author in his paper entitled "Co-Operating Sequential Processes" on pages 43 to 112 in *NATO Advanced Study Institute, Programming Languages*, published in 1968 by Academic Press, London and New York.

In the control for the exclusive use of the common resource in conventional multiprocessing systems, when the processor currently using a common resource becomes inoperative, the control cannot change the contents of the status word back to the usable state. As a result, when another processor requires the common resource, it cannot initiate the operation of handling the common resource, resulting in a so-called "system down".

SUMMARY OF THE INVENTION

One object of the invention is, therefore, to provide a multiprocessing system free from the above-mentioned "system down" occurring when a processor seizing the common resource fails.

According to one aspect of the present invention, there is provided a data multiprocessing system having a plurality of processors, a main memory unit for storing at least one common resource exclusively usable by each processor and for also storing use-status words corresponding to the common resource for indicating the usable or unusable states of the common resource, wherein a processor rewrites the contents of the use-status word read out into the unusable state when one use-status word read out indicates that the common resource is usable, and wherein the processor is inhibited from using the common resource corresponding to the status word when one use-status word read out indicates that the common resource is unusable. Each processor further comprises:

a circuit for rewriting the contents of a use-status word corresponding to the common resource into the unusable state, when said processor uses the common resource;

a circuit responsive to said rewriting circuit to store data representing said processor into a memory area of the corresponding use-status word or in another memory area, said data being paired with the corresponding use-status word;

reporting to another processor circuit for a reporting that said processor has become inoperative;

a data preparing circuit responsive to the inoperative state-reporting signal received from said reporting circuit of another processor to prepare data representing said inoperative other processor;

a circuit for comparing the inoperative other processor-representing data produced from said data preparing circuit with the processor-representing data stored corresponding to or paired with the use-status word; and a circuit responsive to the coincident signal produced from said comparing circuit to change the contents of the corresponding use-status word into the usable state.

BRIEF DESCRIPTION OF THE DRAWINGS

The above and other objects and features of the invention will become apparent from the following detailed description taken in conjunction with the accompanying drawings, in which:

FIG. 4D shows a timing chart for depicting the operation of the circuit shown in FIG. 4C.

In the drawings, like reference numerals represent like structural elements. Also, in the following description, there are several cases where no distinction is made between signals and their corresponding signal paths.

DESCRIPTION OF THE PREFERRED EMBODIMENT

Figures 1, 2:
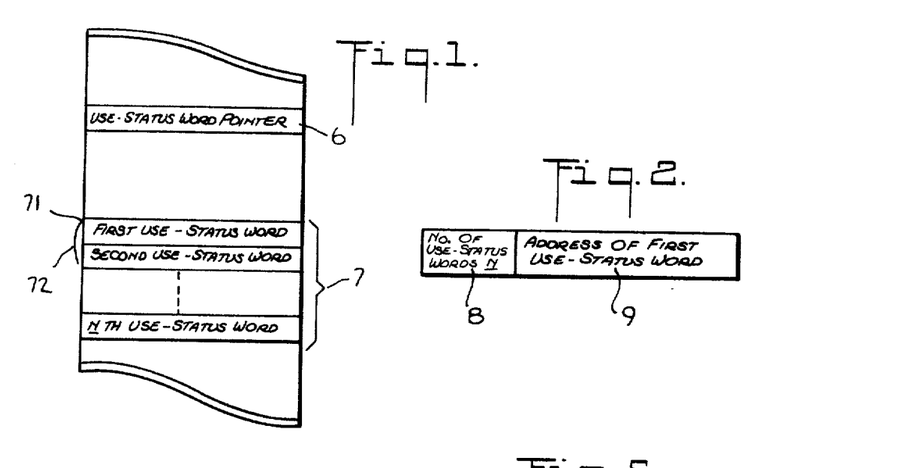
FIG. 1 diagrammatically shows a storing state for a use-status word that pointer and a use-status word are stored in the MMU.
FIG. 2 shows a format of the status word pointer of FIG. 1.

Referring to FIG. 1, a group of status words 7, each of which consists of m bits, and a use-status word pointer 6 for giving an address 71 of the first status word in the words 7 and the total number of the status words 7, are stored in corresponding fixed addresses in the MMU.

Referring to FIG. 2, a format of the pointer 6 comprises a field 8 indicating the number of the status words 7 and a field 9 indicating the first address 71 of the status words 7. When the number of the status words 7 is n, the value of the field 8 is n. Each of the status words corresponds to any one of the common resources in the data multiprocessing system. Also, the respective bits in each status word correspond to the numbers assigned to processors used within the data multiprocessing system, respectively. For example, a state that the i-th (i is equal to m or less than m) bit in a status word is set indicates that the common resource within the system corresponding to that status word is in use, and that a processor having the number i is permitted to have the exclusive use of the common resource. When the common resource in the system corresponding to the status word is not used by any of the processors (that is, the common resource is in the usable state) all the bits in the status word are logical "0".

For explanatory simplicity, however, the embodiment of the invention will be described for the case of the exclusive use of one common resource (that is, for the case of $n=1$.

Figure 3:
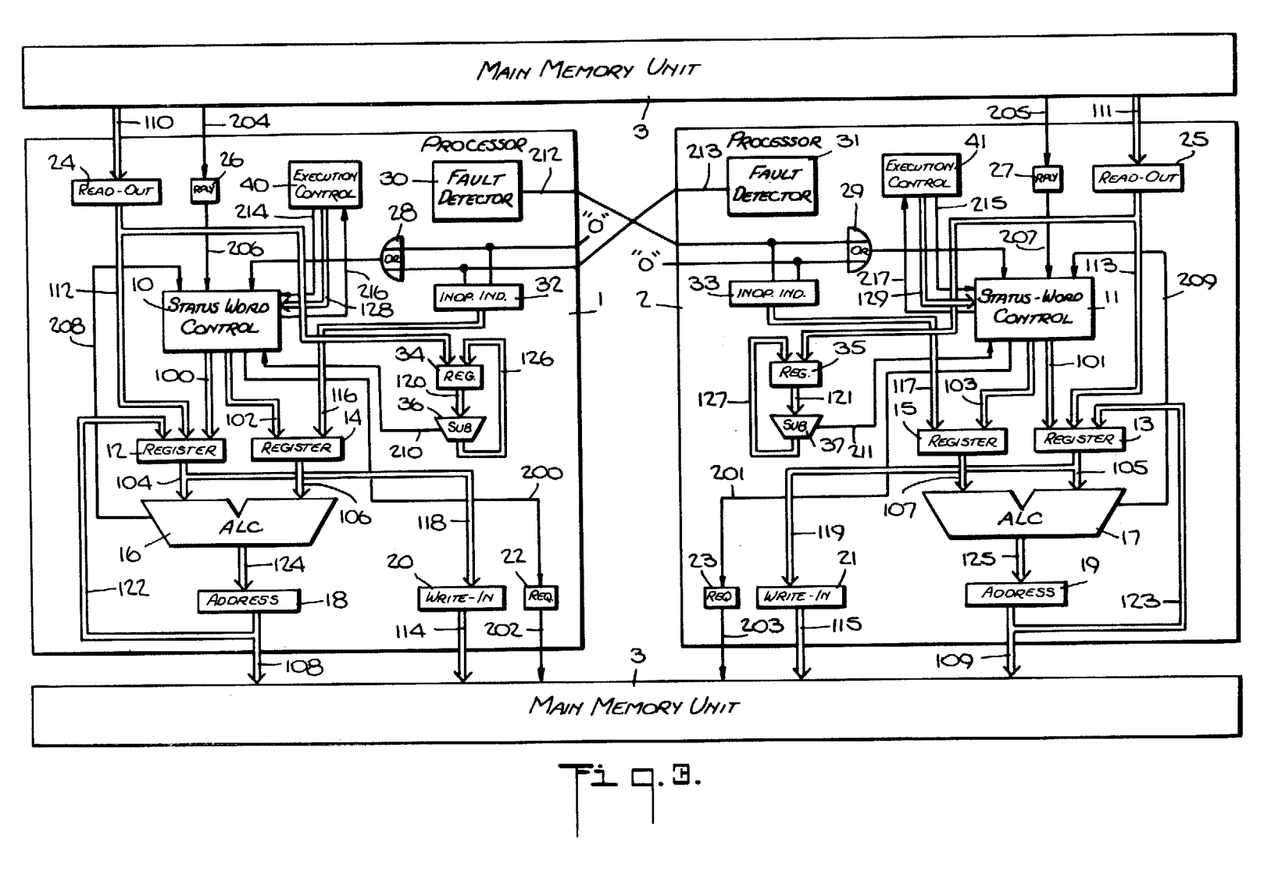
FIG. 3 shows a block diagram of one embodiment of the invention.

Referring to FIG. 3, one embodiment of the invention has a pair of processors 1 and 2, and the MMU 3 which is commonly used by the processors 1 and 2. The processor 1 is comprised of a status word control circuit 10, a first register 12, a second register 14, an arithmetic and logic circuit (ALC) 16, an address register 18, a write-in data register 20, a request register 22, a read-out register 24, a reply register 26, an OR gate 28, a fault detection circuit 30, an inoperative processor-indicating register 32, a register 34, a subtraction circuit 36, and an execution control circuit 40. The data processor 2 includes a status word control circuit 11, a first register 13, a second register 15, an arithmetic and logic circuit (ALC) 17, an address register 19, a write-in register 21, a request register 23, a read-out data register 25, a reply register 27, an OR gate 29, a fault detection register 31, an inoperative processor-indicating register 33, a register 35, a subtraction circuit 37, and an execution control circuit 41.

Figure 4A:
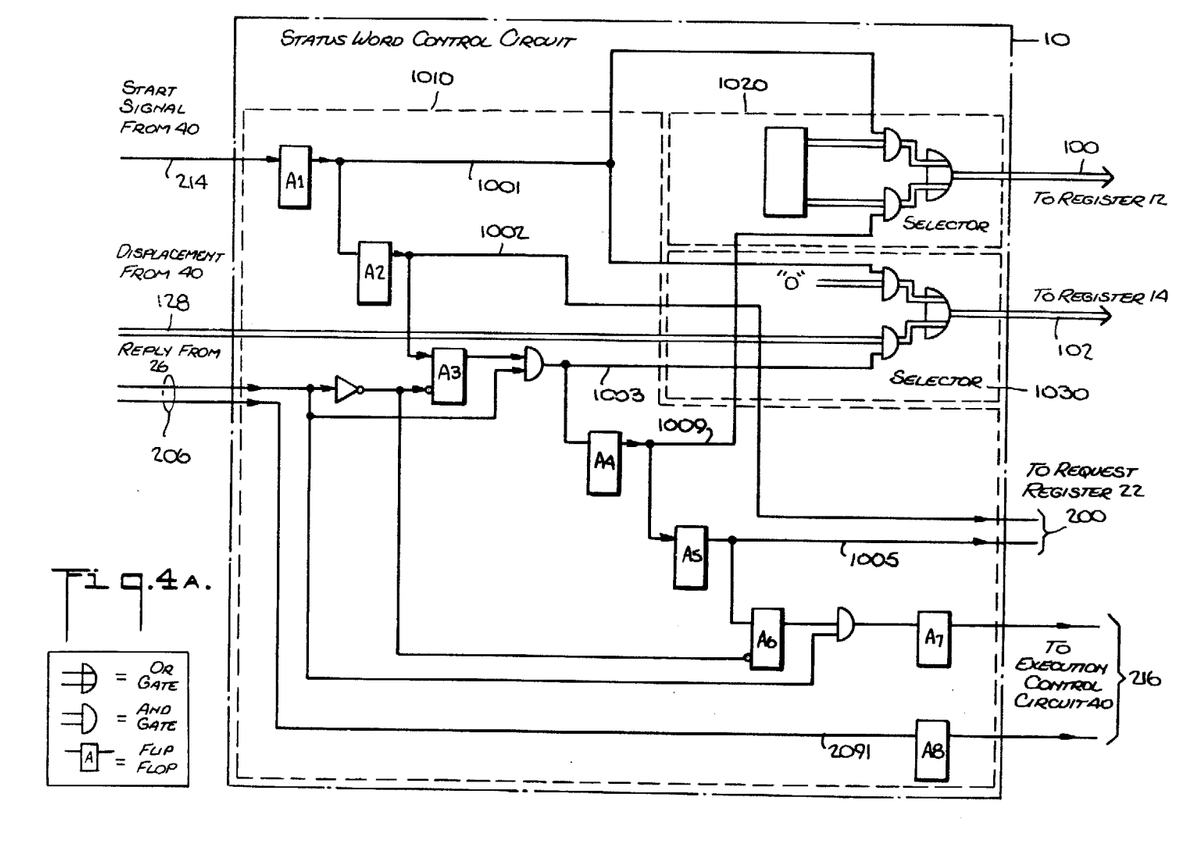
FIG. 4A shows a circuit diagram of a status word control circuit for use in the system shown in FIG. 3.

FIG. 4A shows in detail the status word control circuit 10 for checking whether the common resources present in the MMU 3 are usable or not. The circuit 10 is comprised of a control circuit 1010 and selectors 1020 and 1030. The control circuit 1010 includes flip-flops A1 to A8 and gates. In the figure, small circles attached to the blocks representing the flip-flops A3 and A6 indicate inverters.

Figure 4B:
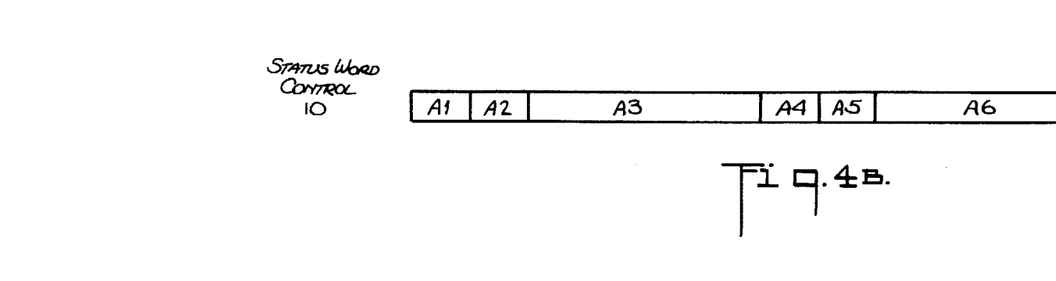
FIG. 4B shows a timing chart for describing the operation of the circuit shown in FIG. 4A.

The operation of the control circuit 10 is diagrammatically illustrated in FIG. 4B.

The operation of the circuit 10 will be given in more detail with reference to FIGS. 1 to 4B. In the embodiment shown in FIG. 3, the execution control circuit 40 for decoding and executing software instructions starts the operation of the control circuit 10. For details of the control circuit 40 reference can be made to an article entitled "MICROPROGRAMMING, Principles and Practices" by Samir S. Husson, pp. 1 to 12, published in 1970 by Prentice-Hall, Inc. The circuit 40 operates as follows: When one processor requires a common resource in the MMU 3, before the use of the resource, the circuit 40 sends a start signal to request the start of the status word control circuit 10 through a signal line 214. Upon receipt of the incoming start signal from the circuit 40, the flip-flop (F/F) A1 shown in FIG. 4A is set. Following the set of the F/F A1, the selector 1020 selects the address of the status word pointer 6 shown in FIGS. 1 and 2 so that said address is set in the register 12 of FIG. 3 through a data line 100 (see a in FIG. 4B). At the same time, logical "0" fixedly produced is selected by the selector 1030, and is then set in the register 14 of FIG. 3 through a data line 102 as shown by b in FIG. 4B. In response to the setting of the F/F A2 after the F/F A1 is set, a read-out request is set in the register 22 of FIG. 3 through a signal line 1002, which is a part of a signal line 200 (c in FIG. 4B). The result of the addition in the ALC 16 is stored in the address register 18 (d in FIG. 4B), and simultaneously the read-out request is transferred to the MMU 3, with the result of the F/F A2.

Responsive to the setting of the F/F A3, the circuit 10 waits until a reply signal "1" is given through a signal line 206 from the MMU 3. As the signal line 206 is logical "1", a displacement 72 from the address 71 of the first status word corresponding to the common resource applied through a data line 128 from the circuit 40, is selected by the selector 1030 (FIG. 3) and set in the register 14 through a data line 102 (e in FIG. 4B). Also, at this time point, the contents of the field 9 shown in FIG. 2, i.e., those of data read-out from the MMU 3 to the read-out data register 24 (FIG. 3) are set in the register 12 (FIG. 3) so as to set the F/F A4 (m in FIG. 4B).

Immediately after the F/F A4 is set, the result of addition made by the ALC 16 is stored in the address register 18 (f in FIG. 4B). The processor number of the processor 1 is selected by the selector 1020 (FIG. 4A) and is set in the register 12 (FIG. 3) through a data line 100 (g in FIG. 4B), so that the F/F A5 may be set.

In response to the setting of the F/F A5, the contents of the register 12 are set in the write-in data register 20 through a data line 118 (h in FIG. 4B). A test-and-set request is stored in the request register 22 shown in FIG. 3 through a signal line 1005 (a part of the signal line 200) (i in FIG. 4B), and at the same time the test-and-set request is sent to the MMU 3 to set the F/F A6.

Following the setting of the F/F A6, the circuit 10 waits until a reply signal "1" is given from the MMU 3 (n in FIG. 4B). When the signal line 206 is logical "1", the F/F A7 is set. Moreover, a value given through a signal line 2061, which represents the previous value of the use-status word given through another signal line 206 is set in the flip-flop (F/F) A8. The contents of the F/Fs A7 and A8 are reported to the execution control circuit 40 through a signal line 216.

Figure 4C:
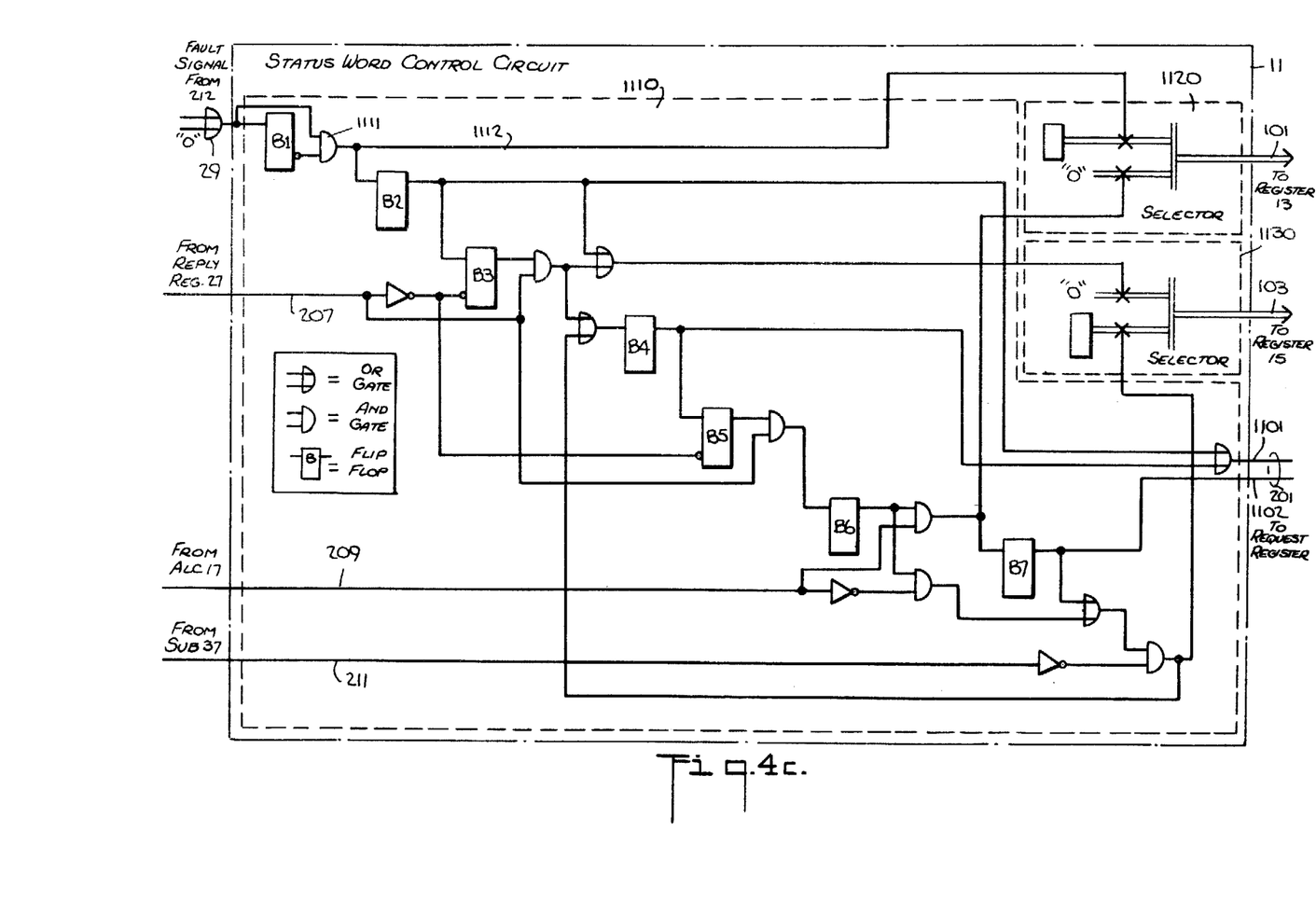
FIG. 4C shows a circuit diagram of another status word control circuit.

FIG. 4C illustrates the use-status word control circuit 11 used in the processor 2 of FIG. 3. On the basis of an inoperative or fault report signal 212 delivered from the data processor 1, the circuit 11 checks whether or not there is a use-status word to be rendered the unlocked state indicating that the common resource in the MMU 3 is usable. As a result, if such a word is found, the control circuit 11 executes the control operation for causing the status word to be in the unlocked state. As shown, the control circuit 11 is composed of a control circuit 1110 including F/Fs B1 to B7 and selectors 1120 and 1130. The operation of the circuit 11 is illustrated in FIG. 4D.

The operation of the control circuit 11 will be described with reference to FIGS. 2, 3, 4C and 4D.

A fault detection signal 212 sent from the processor 1 of FIG. 3 causes the OR gate 29 to produce a logical "1". The logical "1" is then differentiated at the leading edge through the cooperation of the F/F B1 and an AND gate 1111. The differentiated signal brings about the following operation. The fixed address of the pointer 6 (FIG. 2) is selected by the selector 1120 (FIG. 4C) and then is transferred to the register 13 shown in FIG. 3 through the data line 101 to be set in the register 13 (see L1 in FIG. 4D). Logical "0" is selected by the selector 1130 (FIG. 4C) and set in the register 15 (FIG. 3) through a data line 103 as shown by M1 in FIG. 4D.

After the setting of the F/F B1, a read-out request is set in the request register 23 through a signal line 1101 (see N1 in FIG. 4D) in response to the setting of the F/F B2. The result of the addition in the ALC 17 is stored in the address register 19 (R1 in FIG. 4D) and the read-out request signal is sent to the MMU 3. As a result of the setting of the F/F B3 following the setting of the F/F B2, a reply signal supplied through a signal line 207 from the MMU 3 is logical "1" (E in FIG. 4D). The contents of the field 8 in the pointer 6 (FIG. 2) (i.e., the data read out from the MMU3 to the read-out data register 25 (FIG. 3 and F in FIG. 4D)) are loaded into the register 35 (FIG. 3), and the contents of the field 9 are set into the register 13 (P1 and L2 shown in FIG. 4D). Then, logical "0" fixedly produced is selected by the selector 1130 and is set into the register 15 through the data line 103 (M2 in FIG. 4D) as followed by the setting of the F/F B4.

Consequently, the result of the addition by the ALC 17 shown in FIG. 3 is given into the address register 19 (R2 in FIG. 4D). A read-out request signal is then set in the register 23 (FIG. 3) through the signal line 1101 (N2 in FIG. 4D), and is sent to the MMU 3 to set the F/F B5.

As a result, a reply signal coming through the signal line 207 from the MMU3 becomes logical "1" (G in FIG. 4D). At this time point, the data stored in the read-out data register 25 is set into the register 13 through a data line 113 (L3 in FIG. 4D). Next, data indicative of the fault processor 1 set in the register 33 is set into the register 15 through a data line 117 (M3 in FIG. 4D), so that the F/F B6 may be set.

The circuit 11 thereafter operates in one of two ways, depending on the logical product of the contents of the registers 13 and 15 (FIG. 3), which is supplied to conduit 11 from ALC 17 through a signal line 209 after the F/F B6 is set. Stated in more detail, in the first case when the signal line 209 is logical "1", logical "0" fixedly produced is selected by the selector 1120 and is set in the register 13 through a data line 101 (L4 in FIG. 4D) with the result of the setting of the F/F B7.

As a result, the ALC 37 subtracts "1" from the contents of the register 35 in FIG. 3 and the result of the subtraction is stored in the register 35 (P2 in FIG. 4D). As soon as the signal on a signal line 211, which represents the result of the subtraction in the ALC 37, is logical "1" (this signifies that the subtraction result is "0"), the operation of the control circuit 11 is terminated. Meanwhile, however, when the signal line 211 is logical "0", the contents of the address register 19 are set into the register 13 through a data line 123 (L5 in FIG. 4D), a displacement 72 to the next use-status word, from the use-status word which is now used by the processor 2 is selected by the selector 1130 and is set into the register 15 through the data line 103 (M4 in FIG. 4D). Also, the previous contents of the register 13 (L3 in FIG. 4D) are set into the write-in data register 21 through a data line 119 (Q in FIG. 4D). In addition, a write-in request signal is set into the register 23 through a signal line 1102 (W in FIG. 4D) and is then sent to the MMU 3, so that the F/F B4 may be set. The operation that follows is similar to that performed previously after the F/F B4 is set, as already described.

Next, the second case will be described where, when F/F B6 is set, the logical product given through the signal line 209 of the contents of the register 13 (FIG. 3) and the contents of the register 15 (FIG. 3) is logical "0". The ALC 37 subtracts "1" from the contents of the register 35 and the result of the subtraction is set into the register 35 (P2 in FIG. 4D). When the signal line 211 representing the result of the subtraction in the ALC 37 is turned to logical "1" (this means that the subtraction result is logical "0"), the operation of the control circuit 11 is immediately terminated. Meanwhile, when the signal line 211 is logical "0", the contents of the address register 19 are set into the register 13 through the data line 123 (L5 in FIG. 4D). A displacement to the next use-status word from the use-status word, which is now used by the processor 2 is selected by the selector 1130 (FIG. 4C) and is given into the register 15 through the data line 103 (M4 in FIG. 4D), with the result that the F/F B4 is set. The operation that follows is similar to that performed previously after the F/F B4 is set, as already described.

In this way, all the use-status words are checked until the contents of the register 35 becomes zero.

Figure 5:
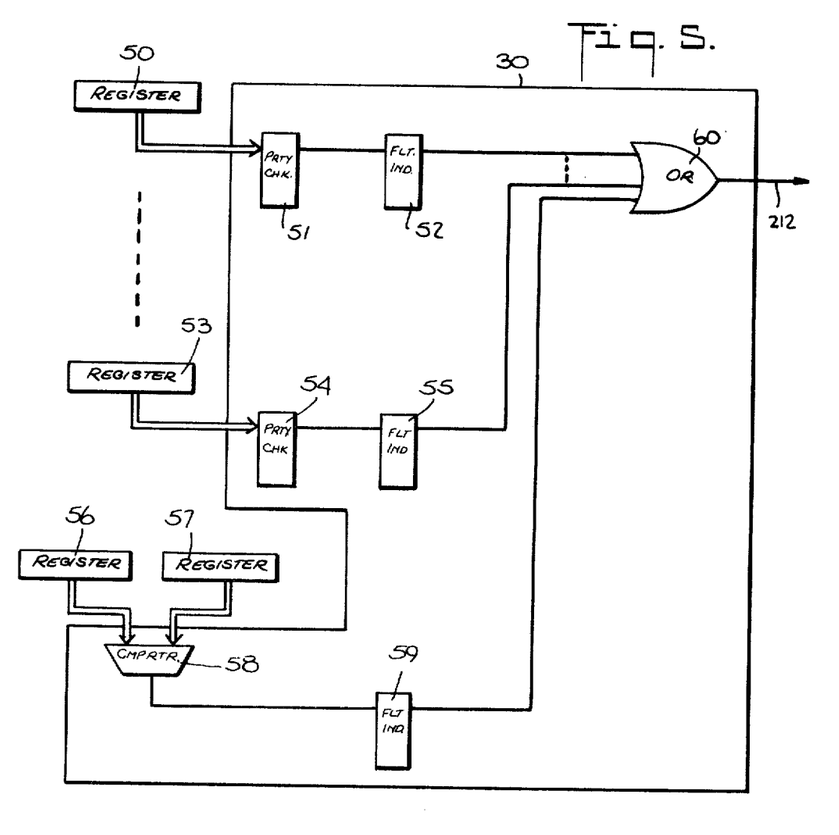
FIG. 5 shows a circuit diagram of a fault detection circuit used in the system shown in FIG. 3.

FIG. 5 shows the fault detection circuit 30 or 31. Generally, the data processor includes several indispensable registers such as those used for storing information to execute the machine error curing operation. When such registers fail, the normal operation of the system cannot be guaranteed at all. For the early cure of the failed registers, the fault detection and the fault report will be carried out as follows:

Referring to FIG. 5, parity checkers 51 and 54 checking parities of the output signals from the registers 50 and 53 are applied as inputs to fault indication F/Fs 52 and 55, respectively. A comparator 58 checks the identity between the contents of registers 56 and 57 doubled in the structure. The output signal from the comparator 58 is given to a fault indication F/F 59. The output signals from the fault indication F/Fs 52, 55 and 59 are sent to an OR gate 60 whose output signal is then given through the control line 213 or 212 to the other processor 1 or 2.

Next, the operation of the present multiprocessing system will be described referring to FIGS. 3 and 4B when the processing system executes a process synchronizing instruction to make an access to control data, which is stored as the common resource to synchronize one processor with another processor. A displacement from the head of the use-status word group in the MMU 3 to the use-status word corresponding to the common resource to be used is sent out from the execution control circuit 40 through the data line 128 to the control circuit 10. At this time point, the circuit 40 also produces a start signal to start the operation of control circuit 10 through the signal line 214. The control circuit 10 decodes and executes the process synchronizing instruction to prepare an address of the use-status word pointer 6 in the MMU3, and loads the address through the data line 100 to the first register 12 (a in FIG. 4B). Logical "0" from the control circuit 10 is stored into the second register 14 through the data line 102 (b in FIG. 4B). These values are applied to the ALC 16 through data lines 104 and 106, respectively (j in FIG. 4B). The result of the addition in the ALC 16 is set through a data line 124 into the address register 18 (d in FIG. 4B). Simultaneously, a read-out request is given into the request register 22 through the control line 200 (c in FIG. 4B). The addition result and the read-out request are then transferred to the MMU 3 through a data line 108 and a control line 202. When the read-out operation in the MMU 3 is completed, the read-out data is set through a data line 110 into the read-out data register 24 (l in FIG. 4B) and a reply signal is given through a control line 204 to the reply register 26 (k in FIG. 4B). Then, the reply signal is reported through the control line 206 to use status word control circuit 10. In response to this report, the contents of the field 9 of FIG. 2 in the pointer are given through a data line 112 to the first register 12 (m in FIG. 4B). At this time point, a displacement from the first status word of those words corresponding to the necessary common resource is set through the data line 102 into the second register 14 (e in FIG. 4B). Then, the result of the addition in the ALC 16 transferred through the data lines 104 and 106 is sent through the data line 124 to the address register 18 (f in FIG. 4B). The data indicating the processor, which is required to change the contents of the use-status word into the usable state, is prepared in the above-mentioned manner, and set through the data line 100 into the first register 12 (g in FIG. 4B). Upon completion of loading from the contents of the first register 12 into the write-in data register 20 through the data line 118 (h in FIG. 4B), a test-and-set request signal is simultaneously set through the control line 200 into the request register 22 (i in FIG. 4B). The write-in address, the write-in data and the test-and set request are then transferred into the MMU 3 through the data lines 108 and 114 and the control line 202. In the MMU 3, the contents of the MMU 3 corresponding to the address indicated by the data line 108 are read out, and, when the contents read out is "0", the write-in data transferred through the data line 114 is set into the address indicated by the data line 108. If the contents read out is not "0", no write-in operation is performed. As soon as the test-and-set operation in the MMU 3 is completed, a reply signal is set through the control line 204 into the reply register 26 (n in FIG. 4B). This setting operation is reported through the control line 206 to the control circuit 10. The control circuit 10 checks the value of the control line representing the previous value of the use-status word transferred through the control line 206. As a result of the checking, when the previous value is "0", the F/F A8 in FIG. 4A is set. If it is not "0", the F/F A8 is reset, and simultaneously the F/F A7 is set to given its "1" output to the execution control circuit 40. Thus, the outputs of the F/Fs A7 and A8 are reported to the control circuit 40 through the signal line 216. In the control circuit 40, when the value of the signal line indicating the value of the output of the F/F A7 given through the signal line 216 becomes "1", if the value of the signal line to represent the output of the F/F A8 given through the signal line 216 is "1", the control circuit 40 executes the use of the common resource. At this time point, if it is "0", the control circuit 40 waits until the execution is permitted or avoids the execution.

In the embodiment described above, the common resource exclusively used corresponds to a single use-status word. However, the common resources corresponding to a plurality of use-status words may also be exclusively used.

The operation of the multiprocessing system in which a processor given permission of the exclusive use of the common resource, fails or becomes inoperative, will be described with reference to FIGS. 3 and 4D. When the inoperative state of one data processor 1, for example, is detected by the fault detection circuit 30 including the well-known parity check circuit or an error detection circuit, the inoperative state of the processor 1 is reported to the other processor 2 through the control line 212 (C in FIG. 4D). The inoperative state signal transferred through the control line 212 is applied and located at the bit position in the fault or inoperative state-indicating register 33 which corresponds to the processor number (D in FIG. 4D). The format of the register 33 is the same as that of the use-status word. In this register, the bit corresponding to the processor number of the processor 2 is expressed by "0". The inoperative state signal is reported to the control circuit 11 through the OR gate 29 for obtaining the logical sum of the inputs to the register 33. In the control circuit 11, the address of the status word pointer in the MMU 3 is prepared and is set into the first register 13 through the data line 101 (L1 in FIG. 4D). Logical "0" is loaded into the first register 15 through the data line 103 (M1 in FIG. 4D). The result of the addition made in the ALC 17 transferred through the data lines 105 and 107 is set in the address register 19 (R2 in FIG. 4D). Simultaneously, a read-out request signal is set into the request register 23 through a control line 201 (N1 in FIG. 4D). The address and read-out request signal are transferred through the data line 109 and the control line 203 to the MMU 3. Upon completion of the read operation in the MMU 3, a reply signal is set into the reply register 27 and the read-out data is given through the data line to the read-out data register 25 (E and F in FIG. 4D). As soon as the reply signal is supplied to the control circuit 11 through the control line 207, the contents of the field 8 in the status word pointer of FIG. 2 given through the data line 113 are set into the register 35, and the contents of the field 9 are set into the first register 13 (P1 and L2 in FIG. 4D). At this time point, logical "0" is set in the register 15 through the data line 103 (M2 in FIG. 4D). The result of the addition made by the ALC 17 of the data given through data lines 105 and 107 is set in the address register 19 (R2 in FIG. 4D), and is then transferred to the MMU 3 through data line 109. At the same time, a read-out request signal is set into the request register 23 through the control line 201 (N2 in FIG. 4D), and is then transferred to the MMU 3 through the control line 203. In response to the read-out operation for the MMU 3, a reply signal is applied through a control line 205 to the reply register 27 and the read-out data is given through a data line 111 to the read-out data register 25 (G and H in FIG. 4D). When the reply signal is reported through the control line 207 to the control circuit 11, the read-out data is set into the first register 13 through the data line 113 (L3 in FIG. 4D). Further, the data which is the inversion of the contents of the inoperative processor-indicating register 33 is given into the second register 15 through the data line 117 (M3 in FIG. 4D). Those data are sent through the data lines 105 and 107 to the ALC 17 where they are logically multiplied (I in FIG. 4D). The result of the AND operation is reported through the control line 209 to the control circuit 11. When the logical product is "0", the control circuit 11 sets logical "0" into the first register 13 through the data line 101 (L4 in FIG. 4D). The logical product "0" means that the inoperative processor is the same as the processor being now checked. The set data is sent through the data line 119 to the write-in data register 21 (Q in FIG. 4D). Simultaneously, a write-in request signal is set into the request register 23 through the control line 201 (W in FIG. 4D). Note here that the address data has already been set in the register 19. Then, the write-in data, write-in address, and the write-in request are supplied through the data lines 109 and 115, and the control line 203 to the MMU 3.

When the logical product is not "0", no operation is performed. This state signifies that the inoperative processor is not the processor indicated by the status word being now checked. In either case, the subtractor 37 subtracts "1" from the data representing the number of the status words stored in the register 35 given through a data line 121, and this result is set into the register 35 through a data line 127 (see P2 in FIG. 4D). The same subtraction result is reported to the control circuit 11 through the control line 211. When the subtraction result is "0", all the status words have been checked, and the operation of the control circuit 11 is completed. On the other hand, when the subtraction result is not "0", it indicates there are still unchecked status words. In this case, the contents of the address register 19 are set into the first register 13 through the data line 123 (L5 into FIG. 4D). Further, a displacement from the present status word to the next status word is set in the second register 15 (M4 in FIG. 4D). Then, the result of the addition from the ALC 17 of data sent from the data lines 105 and 107 is stored in the address register 19 through a data line 125 (R3 in FIG. 4D). The operation is then repeated as described above, until all the status words are checked.

In this way, as soon as a data processor becomes inoperative, another processor changes the contents of the use-status word back to the usable state to release the seized common resource to the use of other processors.

As has been mentioned from the foregoing the data multiprocessing system of the invention can in this way prevent the "system down occurring" when the processor currently using the common resource fails.

The above-described embodiment is considered to be merely illustrative of the present invention and numerous modifications thereof may be devised by those skilled in the art without departing from the spirit and scope of the invention.

What is claimed is:

1. A data multiprocessing system comprising a plurality of processors, a main memory unit for storing at least one common resource exclusively usable by each processor one at a time and for also storing use-status words corresponding to the common resource and having contents for indicating the usable or unusable state of the common resource wherein a processor rewrites into the unusable state the contents of the use-status word read out when said use-status word read out indicates the usable state of that common resource, and wherein the processor is inhibited from using the common resource corresponding to the status word when said use-status word read out indicates the unusable state of that common resource, each processor comprising:

means for changing the contents of a use-status word corresponding to a common resource into the unusable state when said data processor uses that common resource;

means associated with said changing means for storing in a memory area data representing said processor associated with the corresponding use-status word;

reporting means responsive to an inoperative condition of said processor for reporting by way of a signal to another processor that said processor has become inoperative;

data preparing means responsive to an inoperative state-reporting signal received from another one of said processors to prepare data representing said one other processor;

means for comparing the processor-representing data produced from said data preparing means with processor-representing data stored by the storing means of said one other processor to detect coincidence therebetween and produce a signal corresponding to said coincidence; and     means responsive to said coincidence signal produced from said comparing means for changing the contents of the corresponding use-status word into the usable state.

2. A multiprocessing system comprising a plurality of processors, a memory unit for storing data as a common resource available for exclusive use by one processor at a time and for storing use-status information indicative of whether or not said common resource is currently being used by one of said processors, said processors being constructed to receive said common resource data only when the use-status information corresponding thereto is set to indicate a usable state, means connected to said one of said processors for setting said use-status information to indicate a nonusable state when said one of said processors begins use of said common resource and for setting said use-status information to indicate a usable-resource state when said one of said processors completes use of said common resource, and means connected to at least one other of said processors for setting said use-status information back to indicating a usable-resource state when a processor using said common resource has become inoperative.

3. The multiprocessing system of claim 2, wherein said means for setting said use-status information to indicate a nonusable state when said one of said processors begins use of said common resource further comprises means for setting said use-status information to identify said one processor using said common resource and wherein said means for setting said use-status information back to indicating a usable-resource state when said one processor becomes inoperative further comprises fault detecting means for detecting failure of said one processor, data generating means responsive to said fault detecting means for generating fault information to identify the processor which has become inoperative, comparison means responsive to said fault detecting means for comparing said use-status information with said fault information to produce a coincidence signal when a processor using said common resource is the same as a processor which has failed or become inoperative, and means responsive to said coincidence signal for changing said use-status information back to indicating a usable resource state.

4. The multiprocessing system of claim 3, wherein said plurality of processors comprises m processors, said use-status information comprises an m-bit word, said means for setting said use-status information to identify said one of said processors that is using said common resource comprises means for generating an m-bit word wherein each bit corresponds to a separate processor and wherein said word has one of logic "1" or "0" located at the bit position corresponding to the processor using the common resource and the other of logic "1" or "0" located at all other bit positions; said data generating means for generating fault information to identify the processor which has become inoperative comprising means for generating another m-bit word wherein each bit corresponds to a separate processor and wherein said word has one of logic "1" or "0" located at the bit position corresponding to the inoperative processor and the other of logic "1" or "0" located at all other bit positions; and wherein said comparing means comprises arithmetic logic means for comparing said m-bit use-status word with said m-bit fault indicator word to determine coincidence of said respective bit positions indicating identity of a using processor and an inoperative processor.

5. The device of claim 4 wherein said means responsive to said coincidence signal for changing said use-status information comprises means for inverting the logical value of the use-status word bit position corresponding to the processor which is inoperative.

6. The multiprocessing system of claim 3, wherein said common resource further comprises a plurality of common resources, wherein said use-status information corresponding to a common resource further comprises a plurality of use-status words corresponding to said plurality of common resources, and wherein said comparing means comprises means to successively compare each of said plurality of use-status words with said fault information.

7. The multiprocessing system of claim 3, wherein said one of said processors includes a plurality of indispensible registers, wherein at least one of said indepensible registers operates in parity mode, and wherein at least two of said indispensible registers are configured in doubled arrangement, said fault detecting means comprising at least one parity checker connected to said at least one of said registers operating in parity mode; and
at least one comparator connected to said at least two registers in doubled arrangement.

* * * * *

UNITED STATES PATENT AND TRADEMARK OFFICE
CERTIFICATE OF CORRECTION

PATENT NO. : 4,308,580
DATED : December 29, 1981
INVENTOR(S) : Saburo Ohtaki

It is certified that error appears in the above—identified patent and that said Letters Patent is hereby corrected as shown below:

Column 9, line 2, "R2 should read -- R1 --;

Column 10, line 16, "'system down occurring'" to read -- "system down" occurring --.

Signed and Sealed this

*Twenty-fifth* Day of *May 1982*

[SEAL]

Attest:

GERALD J. MOSSINGHOFF

*Attesting Officer*    Commissioner of Patents and Trademarks